(12) United States Patent　(10) Patent No.:　US 8,902,080 B2
Sugawara et al.　(45) Date of Patent:　Dec. 2, 2014

(54) VEHICLE-MOUNTED NARROW-BAND WIRELESS COMMUNICATION APPARATUS AND ROADSIDE-TO-VEHICLE NARROW-BAND WIRELESS COMMUNICATION SYSTEM

(75) Inventors: Hisashi Sugawara, Tokyo (JP); Shigeki Morita, Tokyo (JP); Takashi Maeda, Tokyo (JP); Hiroshi Araki, Tokyo (JP); Yukio Goto, Tokyo (JP); Yuji Igarashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 629 days.

(21) Appl. No.: 13/141,041

(22) PCT Filed: Mar. 2, 2010

(86) PCT No.: PCT/JP2010/001408
§ 371 (c)(1),
(2), (4) Date: Jun. 20, 2011

(87) PCT Pub. No.: WO2010/116601
PCT Pub. Date: Oct. 14, 2010

(65) Prior Publication Data
US 2011/0254699 A1　　Oct. 20, 2011

(30) Foreign Application Priority Data
Apr. 7, 2009　(JP) ................................. 2009-092964

(51) Int. Cl.
*G08G 1/00*　(2006.01)
*G08G 1/16*　(2006.01)
*H04W 4/04*　(2009.01)

(52) U.S. Cl.
CPC　*G08G 1/164* (2013.01); *H04W 4/04* (2013.01)
USPC ...... 340/901; 340/435; 340/905; 340/995.13; 701/408; 701/301; 701/420

(58) Field of Classification Search
CPC .......... G08G 1/096783; G08G 1/0104; G08G 1/161; G08G 1/164; G08G 1/096716; G08G 1/09675

USPC ............. 340/901, 905, 915, 932.2, 919, 435, 340/903, 995.24, 995.13, 937; 701/210, 36, 701/117, 400, 430, 408, 301, 116, 45, 409, 701/420
See application file for complete search history.

(56) References Cited

U.S. PATENT DOCUMENTS 5,270,708 A * 12/1993　Kamishima ............... 340/995.24
5,699,057 A * 12/1997　Ikeda et al. .................... 340/937
(Continued)

FOREIGN PATENT DOCUMENTS

DE　　　600 07 500 T2　　1/2005
DE　10 2007 032 814 A1　　1/2008
(Continued)

*Primary Examiner* — Hoi Lau
(74) *Attorney, Agent, or Firm* — Birch, Stewart, Kolasch & Birch, LLP

(57) ABSTRACT

A vehicle-mounted narrow-band wireless communication apparatus includes: information storing/managing section 905 for storing and managing roadside information from a wireless communication unit and operating condition information from an operating condition detection unit 903; an information provision determination unit 904 for determining whether or not information can be provided on the basis of the roadside information and the operating condition information; an HMI output control unit 906 for controlling HMI output on the basis of a determination result from the information provision determination unit 904 and environment information relating to a junction neighborhood obtained from a parameter management unit 907 for managing parameters relating to an HMI; and an information provision output apparatus 901 for performing information provision on the basis of an HMI output request transmitted from the HMI output control unit 906.

15 Claims, 14 Drawing Sheets

(56) References Cited

U.S. PATENT DOCUMENTS

| | | | |
|---|---|---|---|
| 5,850,176 A * | 12/1998 | Kinoshita et al. | 340/435 |
| 5,865,265 A * | 2/1999 | Matsumoto | 180/169 |
| 6,057,754 A * | 5/2000 | Kinoshita et al. | 340/435 |
| 6,459,991 B1 * | 10/2002 | Takiguchi et al. | 701/301 |
| 6,774,815 B2 * | 8/2004 | Shima et al. | 340/905 |
| 7,302,325 B2 * | 11/2007 | Kudo | 701/36 |
| 8,055,440 B2 * | 11/2011 | Shintani et al. | 701/420 |
| 8,165,748 B2 * | 4/2012 | Goto et al. | 701/36 |
| 8,340,893 B2 * | 12/2012 | Yamaguchi et al. | 701/301 |
| 8,340,894 B2 * | 12/2012 | Yester | 701/301 |
| 8,416,300 B2 * | 4/2013 | Longobardi | 348/153 |
| 8,594,923 B2 * | 11/2013 | Wong et al. | 701/409 |
| 8,618,951 B2 * | 12/2013 | Popovic | 340/905 |
| 8,618,952 B2 * | 12/2013 | Mochizuki | 340/905 |
| 8,712,674 B2 * | 4/2014 | Maruyama | 701/116 |
| 8,806,129 B2 * | 8/2014 | Duvalsaint et al. | 711/118 |
| 8,817,099 B2 * | 8/2014 | Longobardi | 348/148 |
| 8,818,641 B2 * | 8/2014 | Yester | 701/45 |
| 8,823,556 B2 * | 9/2014 | Yester | 340/995.13 |
| 2007/0216528 A1 | 9/2007 | Sanma et al. | |
| 2008/0015772 A1 * | 1/2008 | Sanma et al. | 701/207 |
| 2008/0046175 A1 * | 2/2008 | Tengler et al. | 701/210 |

FOREIGN PATENT DOCUMENTS

| | | |
|---|---|---|
| JP | 2004-184230 A | 7/2004 |
| JP | 2005-11252 A | 1/2005 |
| JP | 2005-318522 A | 11/2005 |
| JP | 2006-82692 A | 3/2006 |
| JP | 2007-67886 A | 3/2007 |
| JP | 2007-241726 A | 9/2007 |
| JP | 2008-198162 A | 8/2008 |

* cited by examiner

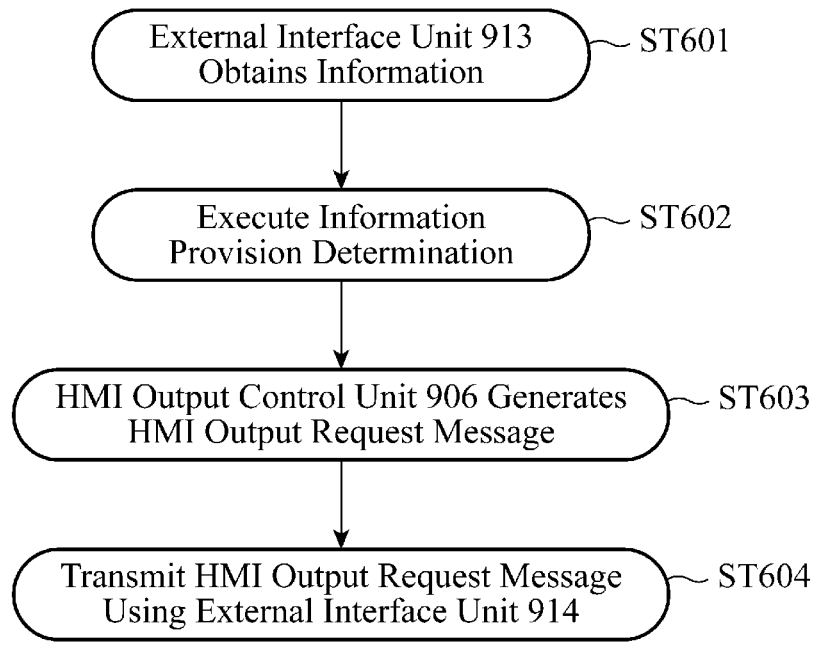

VEHICLE-MOUNTED NARROW-BAND WIRELESS COMMUNICATION APPARATUS AND ROADSIDE-TO-VEHICLE NARROW-BAND WIRELESS COMMUNICATION SYSTEM

TECHNICAL FIELD

The present invention relates to a vehicle-mounted narrow-band wireless communication apparatus and a roadside-to-vehicle narrow-band wireless communication system for providing information relating to safe driving assistance to a driver of a moving body (a vehicle such as a motorcycle or an automobile) quickly and accurately on the basis of information obtained using roadside-to-vehicle communication and operating conditions of the moving body in order to forestall a collision occurring at a junction such as an intersection, for example.

BACKGROUND ART

Collisions, contact accidents, and so on occur frequently at intersections when a direct oncoming moving body cannot be identified due to the shape of a road or the existence of an oncoming moving body or when the position and speed of the direct oncoming moving body are misjudged. Hence, a vehicle-mounted information provision apparatus that provides a driver of a vehicle with travel assistance information using information received through DSRC (registered trademark: Dedicated Short Range Communication; description omitted hereafter), which is a type of dedicated narrow-band wireless communication, has been proposed in the conventional (see Patent Document 1, for example). An information provision determination apparatus, a vehicle-mounted apparatus, and an electronic intersection system that prevent accidents by providing a driver with information when the danger of a collision between a vehicle turning right and a direct oncoming vehicle is determined a high situation have also been proposed (see Patent Document 2, for example).
Patent Document 1: Japanese Patent Application Publication No. 2005-011252
Patent Document 2: Japanese Patent Application Publication No. 2008-198162

SUMMARY OF THE INVENTION

In a conventional vehicle-mounted information provision apparatus using dedicated narrow-band wireless communication, provided services relating to safe driving assistance are essentially specified at each intersection such that the information provision apparatus installed in the moving body provides the information after specifying a single service in advance even in a situation where it is possible to provide a plurality of services (to be described in detail below) simultaneously. Further, with this type of vehicle-mounted information provision apparatus, a plurality of services must be realized by a single unit, and although the number of corresponding services can be expected to increase in the future, expandability is not always taken into consideration in conventional units.

Furthermore, in a case where an information provision determination apparatus disposed on a road identifies a moving body that is in danger of colliding from a relative position of the moving body, conditions of the moving body, and so on and then provides warning information to the identified moving body, the information provision determination apparatus determines an appropriate service for the situation. However, although traffic conditions on the road along which the vehicle is traveling and the operating conditions of the vehicle vary from moment to moment, the information is not updated, switched, and so on in response to variation in these conditions, and therefore the provided service is not always appropriate.

The present invention has been designed to solve these problems, and an object thereof is to provide a vehicle-mounted narrow-band wireless communication apparatus and a roadside-to-vehicle narrow-band wireless communication system for providing a moving body with warning information and updating the warning information at a required timing at an intersection where a plurality of services can be provided.

A vehicle-mounted narrow-band wireless communication apparatus according to the present invention includes:
- a wireless communication unit for receiving, through dedicated narrow-band communication, roadside information relating to a junction that is supplied from a roadside communication apparatus having a communication area that covers a part of a geographical area within a predetermined distance of the junction;
- an operating condition detection unit for detecting an operating condition of a host vehicle;
- a parameter management unit for managing parameters relating to an HMI (human/machine interface);
- information storing/managing section for storing and managing the roadside information from the wireless communication unit and operating condition information from the operating condition detection unit;
- an information provision determination unit for determining whether or not information can be provided on the basis of the roadside information and the operating condition information obtained from the information storing/managing section;
- an HMI output control unit for controlling HMI output on the basis of a determination result from the information provision determination unit and environment information relating to a junction neighbourhood obtained from the parameter management unit; and
- an information provision output apparatus for performing information provision on the basis of an HMI output request transmitted from the HMI output control unit.

A roadside-to-vehicle narrow-band wireless communication system according to the present invention includes:
- a roadside narrow-band wireless communication apparatus for outputting roadside information on the basis of various information relating to a junction and a neighbourhood thereof;
- a roadside communication apparatus which has a communication area that covers apart of a geographical area within a predetermined distance of the junction, and releases the roadside information supplied from the roadside narrow-band wireless communication apparatus through dedicated narrow-band communication; and
- the vehicle-mounted narrow-band wireless communication apparatus according to claim 1, which receives, through dedicated narrow-band communication, the roadside information released by the roadside communication apparatus.

According to the present invention, the determination as to whether or not information can be provided is made on the basis of the obtained roadside information and operating condition information, whereupon HMI output control is performed on the basis of the determination result and the preset, pre-recorded environment information relating to the junction neighbourhood. Information is then provided to a driver on a vehicle-mounted side on the basis of the HMI output request. As a result, the driver can be provided with the information at an appropriate timing.

Further, by managing the information provision output apparatus and the input information and controlling the HMI output respectively in individual modules while providing a common interface specification, design/implementation can be performed for each provided service type. Hence, a vehicle-mounted narrow-band wireless communication apparatus and a roadside-to-vehicle narrow-band wireless communication system that can be expanded in order to accommodate expected future increases in the number of provided services can be provided.

Further, the processing units for determining whether or not to provide information for each provided service are not dependent on other services, and therefore the communication apparatus can be used easily to provide safe driving assistance at an intersection where a plurality of services are provided simultaneously.

BRIEF DESCRIPTION OF THE DRAWINGS

FIG. 19 is a flowchart showing an operation of the vehicle-mounted narrow-band wireless communication apparatus according to Embodiment 3 of the invention; and FIG. 20 is a view showing a message transmitted between the vehicle-mounted narrow-band wireless communication apparatus and an information provision output apparatus, according to Embodiment 3 of the invention.

BEST MODE FOR CARRYING OUT THE INVENTION

Embodiments of the present invention will be described below with reference to the attached drawings in order to illustrate the present invention in further detail.

Embodiment 1

Figure 1:
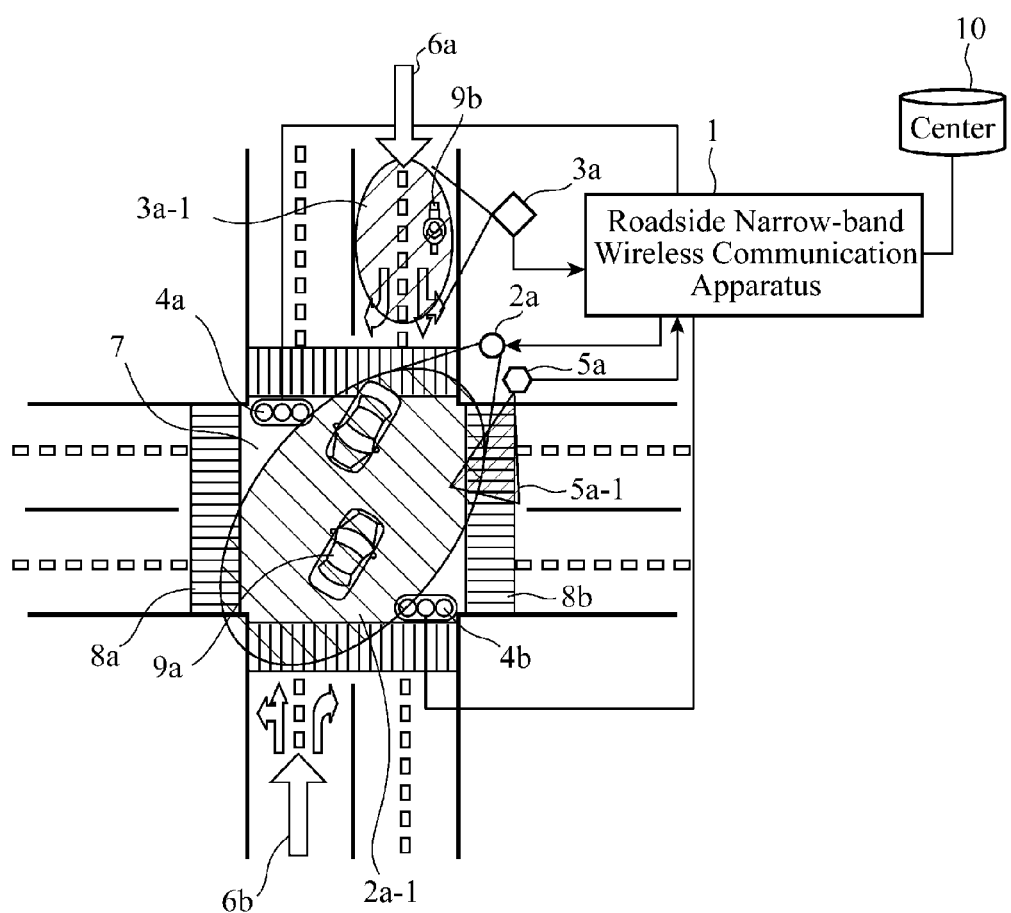
FIG. 1 is a view showing the constitution of a roadside-to-vehicle narrow-band wireless communication system according to Embodiment 1 of the present invention.

FIG. 1 is a pattern diagram showing the constitution of a roadside-to-vehicle narrow-band wireless communication system employing a vehicle-mounted narrow-band wireless communication apparatus, according to Embodiment 1 of the present invention. A system that provides a right-turning vehicle (a vehicle that is turning right or a vehicle waiting to turn right) with information for preventing the right-turning vehicle from colliding with an oncoming vehicle at an intersection is illustrated as an example. Note that in subsequent drawings, parts having identical reference symbols to FIG. 1 denote identical or corresponding components.

A roadside narrow-band wireless communication apparatus 1 is connected to a roadside communication apparatus (a DSRC (beacon), for example) 2a, a vehicle sensing apparatus (an ultrasonic wave sensing apparatus, for example) 3a, stoplight (traffic signal) control apparatuses 4a, 4b serving as apparatuses for controlling a stoplight, a crossing pedestrian detection apparatus (a camera, for example) 5a serving as a crossing condition detection apparatus, and a center 10.

Note that DSRC denotes dedicated narrow-band communication, which is a type of communication that uses a 5.8 GHz (gigahertz) frequency band as a carrier, for example. DSRC is used in ETC (an Electronic Toll Collection System: a nonstop automatic toll collection system) and the like, for example.

The roadside communication apparatus 2a performs dedicated narrow-band wireless communication with a vehicle-mounted narrow-band wireless communication apparatus installed in a vehicle 9a (a second moving body) that enters a communication area 2a-1 disposed to cover at least a part of a geographical area within a predetermined distance of a junction. The roadside communication apparatus 2a encodes desired data in a predetermined format and then transmits the encoded data wirelessly to the right-turning vehicle 9a (the second moving body) in the communication area 2a-1.

The vehicle sensing apparatus 3a obtains behavior information from a vehicle 9b (a first moving body) entering an intersection 7 in a first direction 6a. More specifically, the vehicle sensing apparatus 3a determines the presence of a vehicle within a vehicle sensing range 3a-1 set approximately several meters to several tens of meters back from a stop line of a lane in the first direction 6a, and when a vehicle exists in the vehicle sensing range 3a-1, the vehicle sensing apparatus 3a detects behavior information relating to the vehicle 9b (the first moving body) and notifies the roadside narrow-band wireless communication apparatus 1 of the detection result.

The stoplight control apparatuses 4a, 4b control a stoplight display and notify the roadside narrow-band wireless communication apparatus 1 of information indicating a displayed stoplight such as a green (blue) light, a red light, a yellow light, or a right or left turn arrow.

The crossing pedestrian detection apparatus 5a detects a pedestrian, a bicycle, or the like on a pedestrian crossing 8b. More specifically, the crossing pedestrian detection apparatus 5a detects the existence of a pedestrian, a bicycle, or the like within a crossing pedestrian detection area 5a-1 set at a distance of approximately several meters to several tens of meters, and notifies a moving body behavior information acquisition unit 102 provided in the roadside narrow-band wireless communication apparatus 1 of the detection result.

The center 10 holds environment information such as intersection information relating to the neighbourhood of an intersection, time information, road surface information, and weather information, and inputs this environment information into the roadside narrow-band wireless communication apparatus 1.

Figure 2:
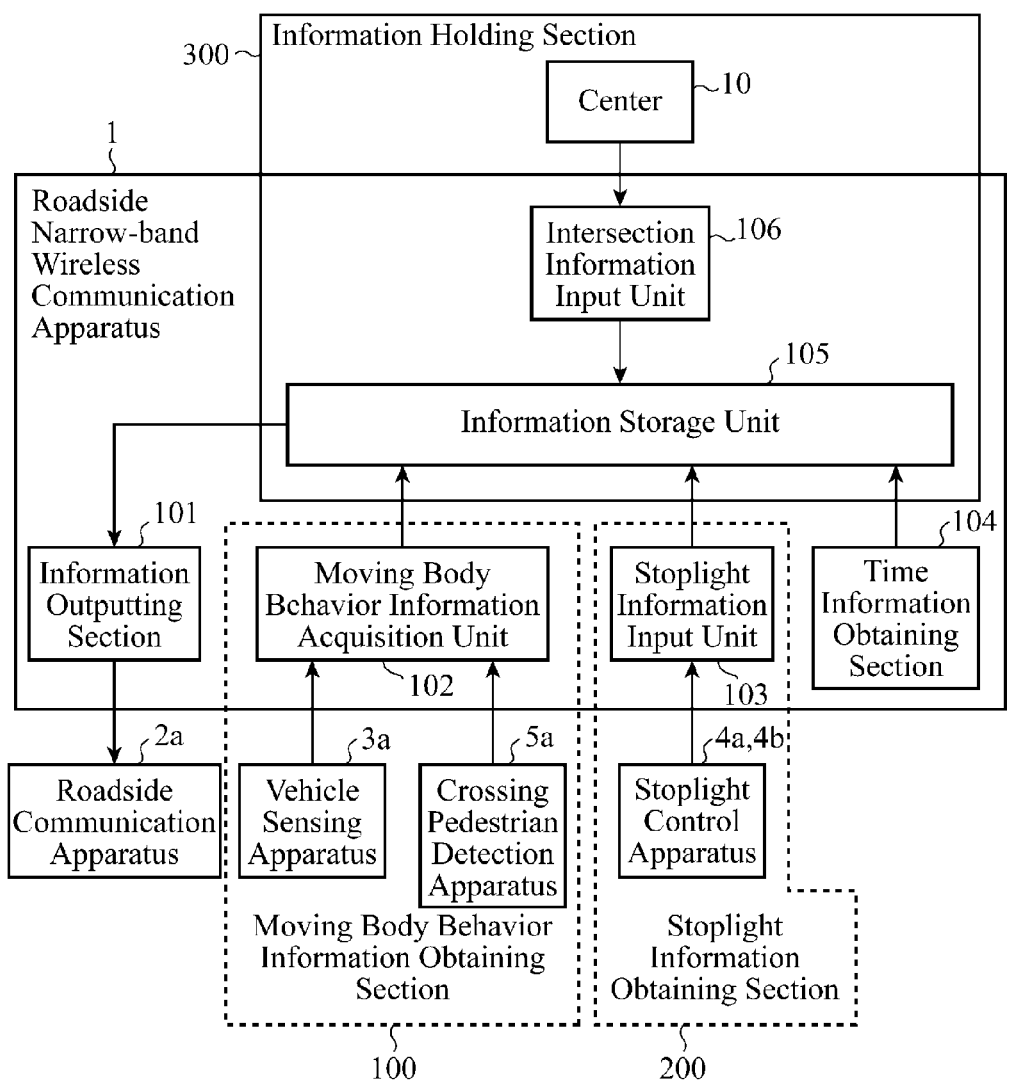
FIG. 2 is a block diagram showing the constitution of a roadside narrow-band wireless communication apparatus according to Embodiment 1 of the invention.

FIG. 2 is a block diagram showing the constitution of the roadside narrow-band wireless communication apparatus 1 according to Embodiment 1 of the present invention.

The roadside narrow-band wireless communication apparatus 1 includes information outputting section 101, the moving body behavior information acquisition unit 102, a stoplight information input unit 103, time information obtaining section 104, an information storage unit 105, and an intersection information input unit 106.

Note that the moving body behavior information acquisition unit 102, the vehicle sensing apparatus 3a, and the crossing pedestrian detection apparatus 5a together constitute moving body behavior information obtaining section 100 for obtaining behavior information relating to the first moving body 9b as well as pedestrians and bicycles.

The stoplight information input unit 103 and the stoplight control apparatuses 4a, 4b together constitute stoplight information obtaining section 200 for obtaining stoplight information relating to the intersection.

The information storage unit 105, the intersection information input unit 106, and the center 10 together constitute information holding section 300 for holding intersection information relating to the intersection, warning information, and distribution control information defining timings for distributing the warning information.

The moving body behavior information acquisition unit 102 obtains behavior information (a detection time, a detection position, speed information, and so on) relating to the vehicle 9b (the first moving body) entering the intersection 7 in the first direction 6a within the vehicle sensing range 3a-1 of the vehicle sensing apparatus 3a periodically from the vehicle sensing apparatus 3a, and stores the type of the apparatus from which the behavior information is obtained and the acquisition time in the information storage unit 105.

Further, the moving body behavior information acquisition unit 102 obtains information indicating the existence of a pedestrian, a bicycle, or the like within the crossing pedestrian detection area 5a-1 periodically from the crossing pedestrian detection apparatus 5a and stores the obtained behavior information in the information storage unit 105.

The stoplight information input unit 103 inputs stoplight information transmitted by the stoplight control apparatuses 4a, 4b and stores the input stoplight information in the information storage unit 105.

The time information obtaining section 104 obtains time information and stores the obtained information in the information storage unit 105. Note that in FIG. 2, the time information obtaining section 104 is provided in the interior of the roadside narrow-band wireless communication apparatus 1, but the time information may be input externally.

The intersection information input unit 106 inputs the environment information held by the center 10, such as intersection information (a position of the intersection, a speed limit at the intersection, a time required to turn right, and so on), time information, road surface information, and weather information, and stores the input information in the information storage unit 105.

Note that the environment information may be stored in the information storage unit 105 in advance.

The information outputting section 101 outputs the moving body behavior information, stoplight information, time information, and intersection information stored in the information storage unit 105 to the roadside communication apparatus 2a at a specific period. The roadside communication apparatus 2a transmits this information to the right-turning vehicle 9a (the second moving body) through dedicated narrow-band wireless communication.

A moving body communication terminal disclosed in Japanese Patent Application Publication No. 2005-318522, for example, may be applied to the information outputting section 101. In this manner, the roadside narrow-band wireless communication apparatus 1 can communicate with a vehicle-mounted narrow-band wireless communication apparatus 9 (see FIG. 3) that is capable of DSRC roadside-to-vehicle communication.

Figure 3:
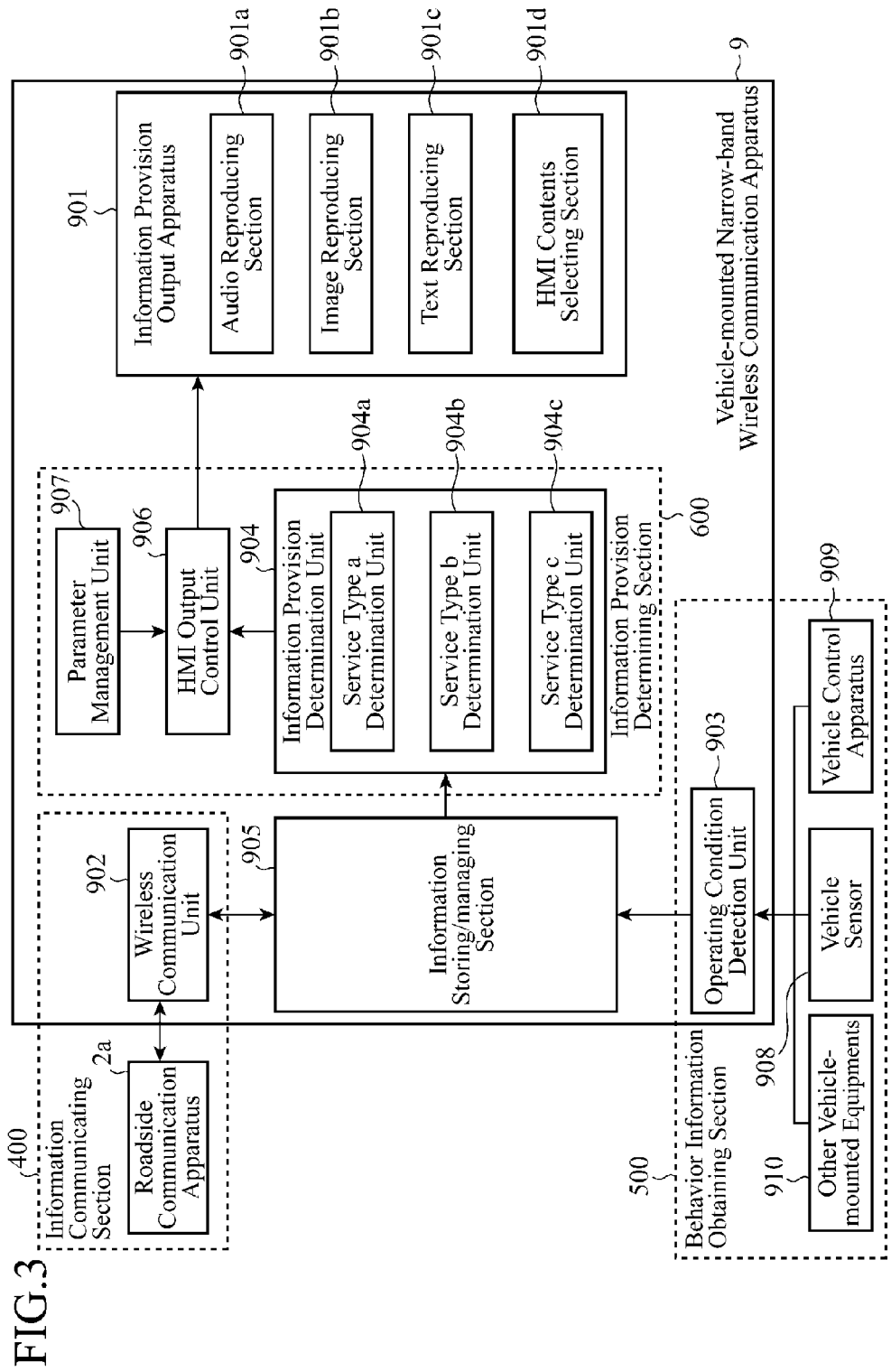
FIG. 3 is a block diagram showing the constitution of a vehicle-mounted narrow-band wireless communication apparatus according to Embodiment 1 of the invention.

FIG. 3 is a block diagram showing the constitution of the vehicle-mounted narrow-band wireless communication apparatus (to be abbreviated to vehicle-mounted apparatus hereafter) 9 according to Embodiment 1 of the present invention. In the drawing, the vehicle-mounted apparatus 9 includes a wireless communication unit 902 for performing dedicated narrow-band wireless communication with the roadside communication apparatus 2a, other vehicle-mounted equipments 910 such as a car navigation system and an optical beacon vehicle-mounted system, an operating condition detection unit 903 for inputting in-vehicle information (behavior information relating to the second moving body 9a) such as a vehicle position and a vehicle speed from a vehicle sensor 908 or a vehicle control apparatus 909, information storing/managing section 905 for storing information input from the operating condition detection unit 903 and information distributed by the roadside communication apparatus 2a via the wireless communication unit 902 and managing the obtained information by performing decoding processing and so on, an information provision determination unit 904 for determining whether or not to transmit a warning to a driver driving the second moving body 9a on the basis of the information recorded in the information storing/managing section 905, a parameter management unit 907 for managing parameters relating to an HMI, an HMI output control unit 906 for performing HMI control on the basis of a determination result from the information provision determination unit 904 and parameters obtained from the parameter management unit 907, and an information provision output apparatus 901 for providing the driver with information on the basis of a display request obtained from the HMI output control unit 906.

Note that the wireless communication unit 902 and the roadside communication apparatus 2a together constitute information communicating section 400 for obtaining behavior information relating to the first moving body 9b and neighbouring information such as stoplight information and intersection information.

The operating condition detection unit 903, the vehicle control apparatus 909, the vehicle sensor 908, and the other vehicle-mounted equipments 910 together constitute behavior information obtaining section 500 for obtaining behavior information relating to the second moving body 9a.

The information provision determination unit 904, the HMI output control unit 906, and the parameter management unit 907 together constitute information provision determining section 600 for determining the content and provision timing of the warning information.

The information storing/managing section 905 stores vehicle information constituted by vehicle classification information (an identifier (ID)), a vehicle type, a vehicle length, and a vehicle height, and constantly stores in-vehicle information such as a vehicle position, a speed, a bearing, a blinker condition, and a brake condition, which is obtained from the other vehicle-mounted equipments 910, the vehicle sensor 908, or the vehicle control apparatus 909 via the operating condition detection unit 903.

Further, the information storing/managing section 905 performs decoding processing and the like on the obtained information, and shares a common interface specification with the information provision determination unit 904. Furthermore, the information storing/managing section 905 is capable of providing the roadside communication apparatus 2a with the recorded vehicle information and in-vehicle information as uplink information via the wireless communication unit 902.

Table 1 shows a constitutional example of service types. The service types define types of provided services provided at an intersection (to be abbreviated to "service types" hereafter). Note that a service type according to Embodiment 1 indicates a service for providing a right-turning vehicle (a vehicle that is turning right or a vehicle waiting to turn right) with information preventing the right-turning vehicle from colliding with an oncoming vehicle at an intersection, and therefore corresponds to "Service type 7: Right turn collision information provision service" in Table 1.

TABLE 1

| Service name | Service type |
| --- | --- |
| Accident mode information provision service | 1 |
| Temporary stop regulation information provision service | 2 |
| Head-on collision information provision service | 3 |
| Speed information provision service | 4 |
| Oncoming vehicle approach information provision service | 5 |
| Danger zone avoidance control service | 6 |
| Right turn collision information provision service | 7 |

TABLE 1-continued

| Service name | Service type |
| --- | --- |
| Left turn involvement information provision service | 8 |
| Pedestrian crossing information provision service | 9 |
| Main road convergence assistance information provision service | 10 |
| Rear-end collision prevention information provision service | 11 |
| Stoplight information provision service | 12 |

The information provision determination unit 904 includes a determination unit for each service type. When three service types a to c are provided, for example, the information provision determination unit 904 is constituted by a service type a determination unit 904a, a service type b determination unit 904b, and a service type c determination unit 904c, as shown in FIG. 3. Each determination unit 904a to 904c determines whether or not the second moving body 9a is in a condition for receiving the corresponding service on the basis of the information obtained from the information storing/managing section 905, and notifies the HMI output control unit 906 of the determination result.

Table 2 shows a constitutional example of determination results according to Embodiment 1. The determination results are constituted by the service type and a scale (to be referred to as an "order of precedence" hereafter) indicating a degree of urgency of the warning information. The information provision output apparatus 901 provides the driver of the second moving body 9a with information by reproducing images and audio associated with the determination results. Note that "Order of precedence 2: Defer" is provided for the purpose of an operation check, and by applying this order of precedence 2 when an error or the like occurs, the error can be confirmed visually or aurally by the information provision output apparatus 901.

Further, orders of precedence 6 and 7 are provided to suppress forward advancement in a situation where the danger of a collision is high. Here, the reproduced audio is modified, but the driver of the second moving body 9a may be alerted by modifying an alert sound or the like.

TABLE 2

| Service type | Order of precedence | Reproduced image | Reproduced audio |
| --- | --- | --- | --- |
| 7: Right turn collision information provision service | 0, 6 to 63 | Not defined | Not defined |
| | 1 | No display | None |
| | 2 | Defer | Defer |
| | 3 | Under Service | None |
| | 4 | Automobile | "Beware of oncoming vehicle" |
| | 5 | Motorcycle | "Beware of oncoming motorcycle" |
| | 6 | Automobile (brake variation ON→OFF) | "Vehicle oncoming" |
| | 7 | Motorcycle (brake variation ON→OFF) | "Motorcycle oncoming" |

The HMI output control unit 906 secures an area for holding contents under reproduction and contents awaiting reproduction, and adjusts the order of precedence and reproduction timing of the reproduction contents every time a determination result is obtained from the information provision determination unit 904. Here, the contents indicate the content of the reproduced images and audio associated with the service type and the respective orders of precedence, as shown in Table 2.

Figure 4:
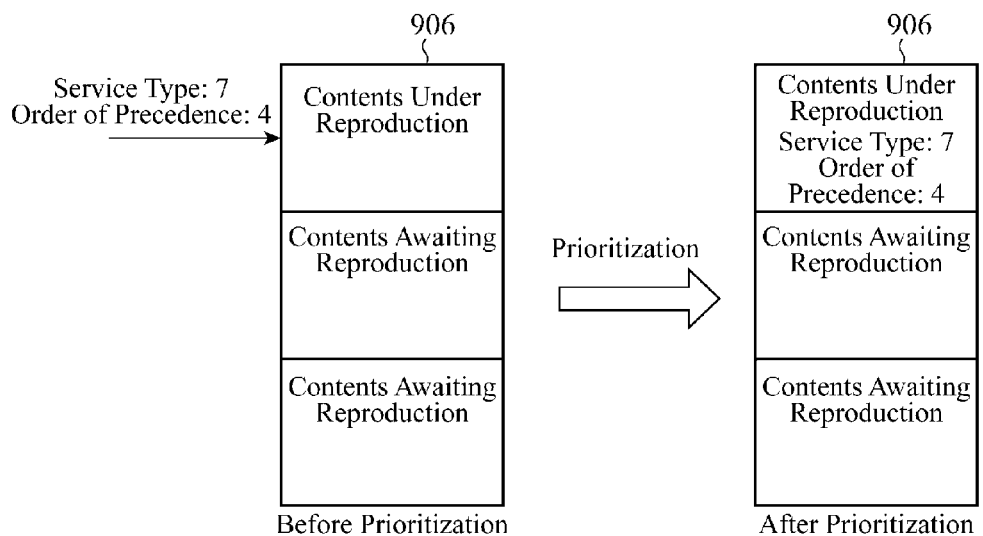
FIG. 4 is a view illustrating a method of determining an order of precedence of determination results according to Embodiment 1 of the invention.

FIG. 4 shows an example of an operation of the HMI output control unit 906 according to Embodiment 1 of the present invention. As described above, the HMI output control unit 906 secures an area for holding the contents under reproduction and the contents awaiting reproduction. The service type according to Embodiment 1 is "7: Right turn collision information provision service", and therefore the HMI output control unit 906 checks variation in the order of precedence before and after acquisition of the determination result from a service type 7 determination unit (not shown). As shown in FIG. 4, when the HMI output control unit 906 does not hold contents under reproduction or contents awaiting reproduction, the HMI output control unit 906 forwards the determination result to the information provision output apparatus 901 as is and holds the determination result as the contents under reproduction. The HMI output control unit 906 also measures an elapsed time from the point at which the contents under reproduction are held.

Figure 5:
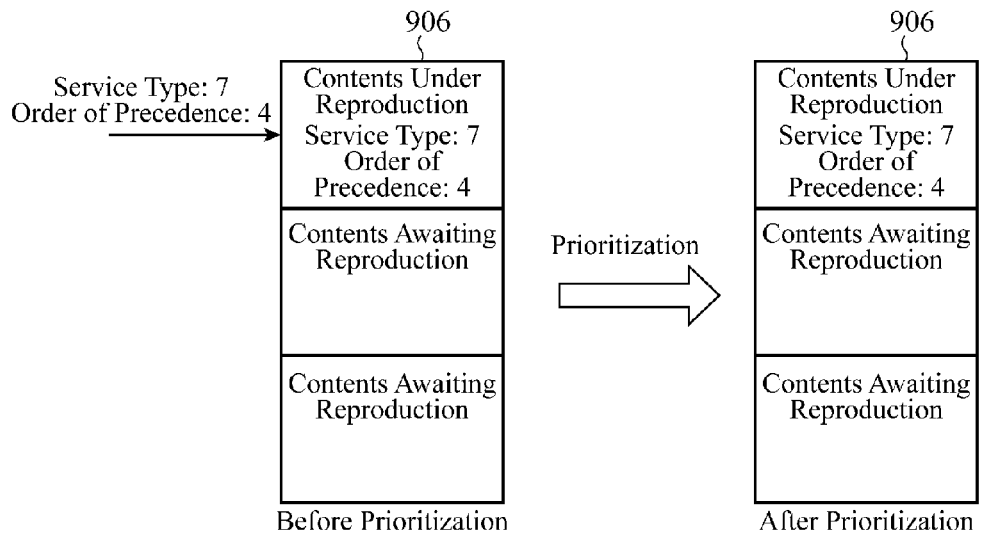
FIG. 5 is a view illustrating a method of determining an order of precedence relating to an HMI output request according to Embodiment 1 of the invention.

FIG. 5 shows an example of an operation of the HMI output control unit 906 according to Embodiment 1. FIG. 5 is constituted similarly to FIG. 4, and therefore descriptions thereof will be omitted. As shown in FIG. 5, when the contents under reproduction in the HMI output control unit 906 is identical to the contents of the determination result, the determination result is discarded so that duplicate information is not provided.

Table 3 shows a constitutional example of guaranteed reproduction times of Service type 7: Right turn collision information provision service, according to Embodiment 1. Here, the guaranteed reproduction time is a time required to utter the reproduction audio, for example, which is provided to prevent information provision that confuses the driver.

TABLE 3

| Service type | Order of precedence | Guaranteed reproduction time |
| --- | --- | --- |
| 7: Right turn collision information provision service | 0, 6 to 63 | Not defined |
| | 1 | 0 |
| | 2 | Defer |
| | 3 | 1 [sec] |
| | 4 | 2 [sec] |
| | 5 | 3 [sec] |
| | 6 | 2 [sec] |
| | 7 | 3 [sec] |

Figure 6:
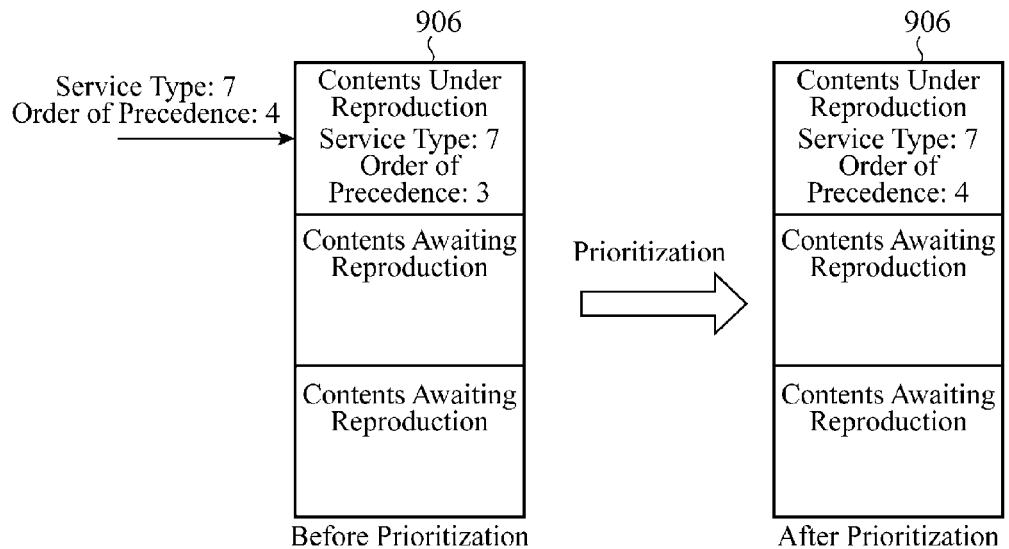
FIG. 6 is a view illustrating a method of determining an order of precedence relating to an HMI output request according to Embodiment 1 of the invention.

FIG. 6 shows an example of an operation of the HMI output control unit 906 according to Embodiment 1. FIG. 6 is constituted similarly to FIG. 4, and therefore descriptions thereof will be omitted. As shown in FIG. 6, when the contents under reproduction of the HMI output control unit 906 and the service type of the determination result are identical but the orders of precedence thereof are different, the orders of precedence are compared and the service having the higher order of precedence is reproduced. When the reproduction contents are updated at this time, a parameter indicating the guaranteed reproduction time shown in Table 3 is obtained from the parameter management unit 907 and compared with the elapsed time following holding of the reproduction contents. When the elapsed time is smaller than the guaranteed reproduction time, the reproduction contents are updated after waiting for the elapsed time and the guaranteed reproduction time to become equal. Further, as an exception, only when the guaranteed reproduction time of reproduction contents relating to the orders of precedence 6 and 7 has elapsed, the order of precedence of reproduction contents to be held is switched to 4 and 5, thereby avoiding duplicate information as shown in FIG. 5.

Figure 7:
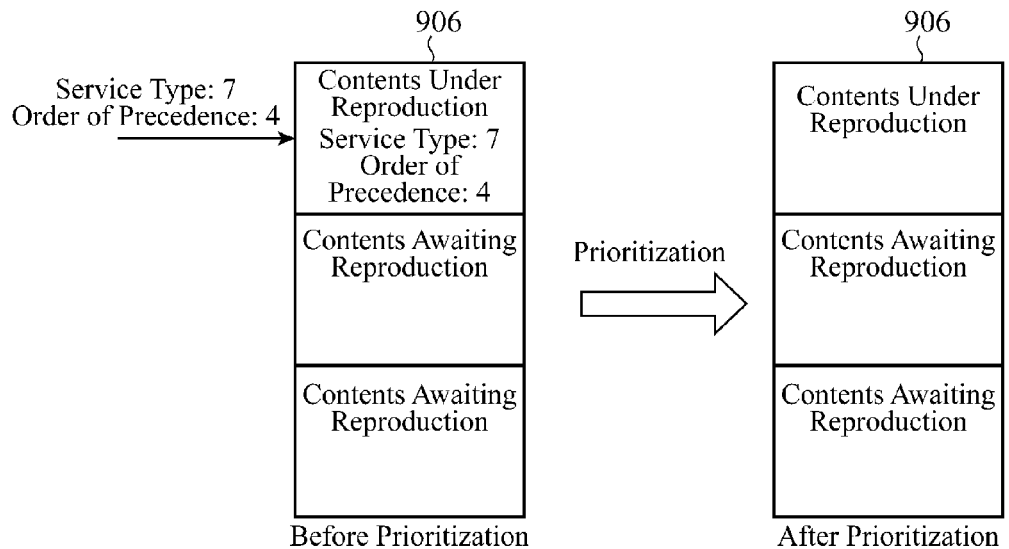
FIG. 7 is a view illustrating a method of determining an order of precedence relating to an HMI output request according to Embodiment 1 of the invention.

FIG. 7 shows an example of an operation of the HMI output control unit 906 according to Embodiment 1. FIG. 7 is constituted similarly to FIG. 4, and therefore descriptions thereof will be omitted. As shown in FIG. 7, when the HMI output control unit 906 obtains a determination result corresponding to contents indicating no display, the HMI output control unit 906 forwards the determination result to the information provision output apparatus 901 regardless of the presence or absence of reproduction contents, and deletes the contents under reproduction.

The information provision output apparatus 901 is constituted by audio reproducing section 901a for reproducing audio, image reproducing section 901b for reproducing images, text reproducing section 901c for reproducing text, and HMI contents selecting section 901d for selecting HMI contents on the basis of the determination result. By having the HMI contents selecting section 901d select the HMI contents associated with the service type and the order of precedence on the basis of the determination result from the information provision determination unit 904 and the HMI output control unit 906, warning information such as right turn warning information, oncoming vehicle warning information, and pedestrian warning information that is expressed by audio, images, text, and so on, can be reproduced by using the reproducing section 901a, 901b, 901c.

Figure 8:
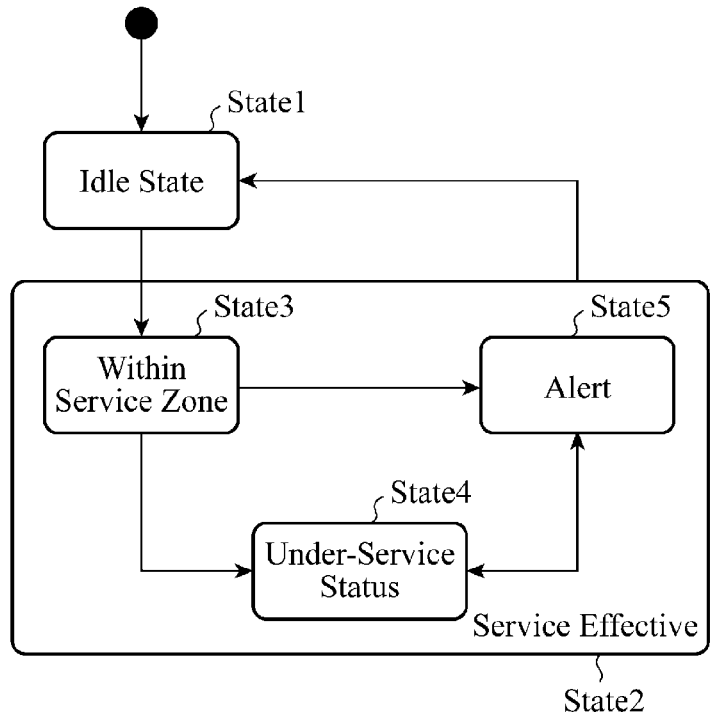
FIG. 8 is a state transition diagram illustrating an outline of an information provision determination operation according to Embodiment 1 of the invention.

FIG. 8 is a state transition diagram showing an operational outline of the vehicle-mounted apparatus 9 according to the present invention, and shows an operation of the information provision determination unit 904. It will now be explained using Embodiment 1 as an example.

In State 1, either the information required by the vehicle-mounted apparatus 9 for the service relating to "Service type 7: Right turn collision information provision service" does not exist in the information storing/managing section 905 or the service cannot be provided because a host vehicle has already passed the intersection serving as the service provision subject or the like.

In State 2, the service can be provided.

State 3 is a sub-state of State 2, representing a state in which neither under service (order of precedence 3) nor alert (orders of precedence 4 and 5) is established.

State 4 is a sub-state of State 2 in which an oncoming vehicle to which the driver should be alerted does not exist.

State 5 is a sub-state of State 2 in which an oncoming vehicle to which the driver should be alerted exists.

Figure 9:
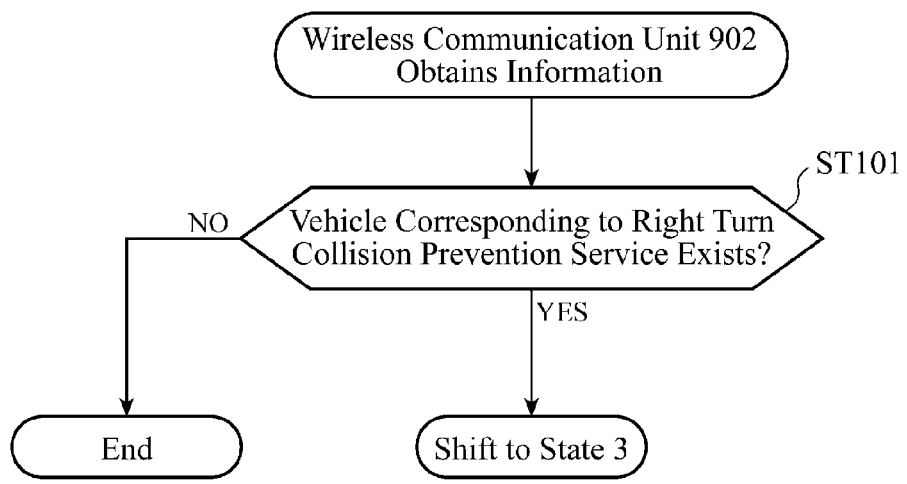
FIG. 9 is a flowchart showing an example of a determination as to whether or not a service is effective according to Embodiment 1 of the invention.

FIG. 9 is a flowchart illustrating an operation of the vehicle-mounted apparatus 9 according to Embodiment 1, and shows an operation performed by the information provision determination unit 904 in State 2 of FIG. 8. In FIG. 9, a determination is made as to whether or not the second moving body 9a entering the intersection has obtained the information required for the right turn collision prevention service according to Embodiment 1. When the wireless communication unit 902 has obtained the information from the roadside communication apparatus 2a through narrow-band wireless communication, the information provision determination unit 904 checks in a step ST101 whether or not oncoming vehicle information corresponding to this service exists in the information storing/managing section 905.

When oncoming vehicle information cannot be obtained in the process described above, the operation is terminated (no processing is performed until information is next obtained). When oncoming vehicle information can be obtained, the information provision determination unit 904 shifts to State 3.

Figure 10:
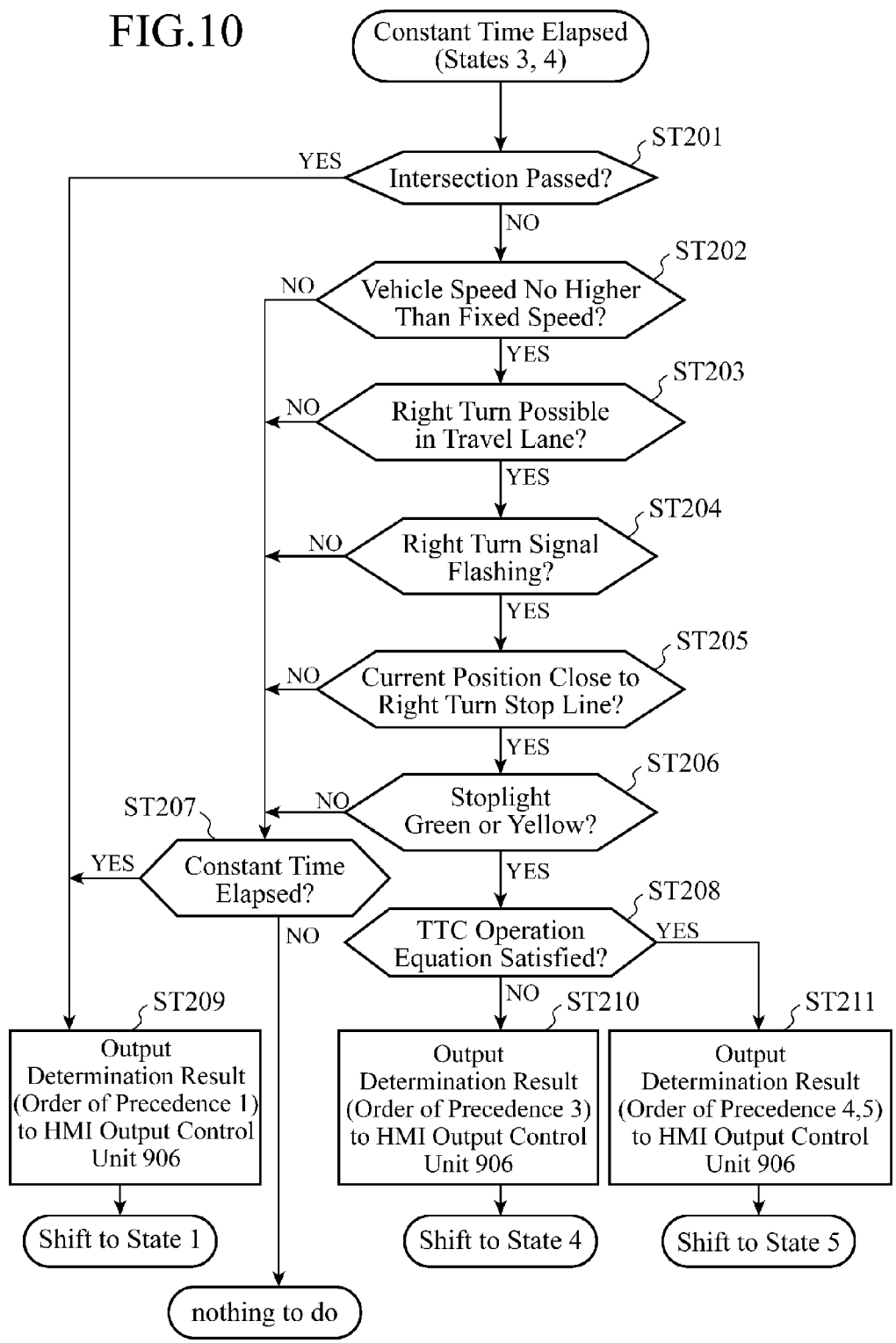
FIG. 10 is a flowchart showing an example of a determination as to whether or not to provide information according to Embodiment 1 of the invention.

FIG. 10 is a flowchart illustrating an operation of the vehicle-mounted apparatus 9 according to Embodiment 1. FIG. 10 shows an operation performed by the information provision determination unit 904 in State 3 or State 4 of FIG. 8. Note that in States 3 and 4, the operation is performed for each constant period.

In a step ST201, a determination is made as to whether or not the second moving body 9a has crossed the intersection. More specifically, the information provision determination unit 904 determines that the intersection has been crossed when the intersection information obtained from the information storing/managing section 905 indicates that a traveled distance of the host vehicle is large. When the above process shows that the intersection has been crossed, the information provision determination unit 904 determines that the service is complete. Accordingly, the information provision determination unit 904 transmits a determination result having the order of precedence 1 to the HMI output control unit 906 and shifts to State 1.

Next, a determination as to whether or not the second moving body 9a entering the intersection is a second moving body 9a to which the right turn collision prevention service according to Embodiment 1 can be provided is made in steps ST202 to ST206.

As a specific determination method, the second moving body 9a is determined to be a vehicle waiting to turn right, i.e. a vehicle to which the aforesaid oncoming vehicle information should be provided, when all of the following requirements are satisfied: the vehicle speed is no higher than a fixed vehicle speed indicating that the second moving body 9a is waiting to turn right in the step ST202; the second moving body 9a is traveling in a lane where a right turn is possible in the step ST203; a right turn signal is flashing in the step ST204; the second moving body 9a is currently positioned in the vicinity of a right turn stop line in the step ST205; and a stoplight is green or yellow, indicating that travel is possible, in the step ST206.

When it is determined in the above process that the second moving body 9a is not a vehicle waiting to turn right, the operation advances to a step ST207, and when this state remains established continuously for a constant time, it is determined in a step ST209 that the service is complete, whereupon the information provision determination unit 904 transmits a determination result having the order of precedence 1 to the HMI output control unit 906 and shifts to State 1. When the state does not remain established continuously for the constant time, no processing is performed. When the second moving body 9a is determined to be a vehicle waiting to turn right, the operation advances to a step ST208.

In the step ST208, a determination is made as to whether or not an oncoming vehicle with which a right turn collision may occur exists. More specifically, a determination is made as to whether or not a following TTC equation is satisfied.

In the TTC equation of the step ST208, a determination is made as to whether or not warning information can be provided by comparing a required time $Tp1$ required for the first moving body 9b entering the intersection 7 in the first direction 6a to reach a center of the intersection (determined from $Tp1=L/V1$ on the basis of a vehicle speed $V1$ of the first moving body 9b detected by the vehicle sensing apparatus 3a and a distance $L$ between the vehicle sensing apparatus 3a and the center of the intersection) with a sum of a delay time $Tds$ required for the warning information to be provided to the driver of the second moving body 9a after detecting the first moving body 9b (determined from $Tds=T-T1$ using a time $T1$ at which the vehicle sensing apparatus 3a detects the first moving body 9b and a current time $T$) and the larger of a required time $Tp2$ required for the second moving body 9a to turn right and a time $Tr$ in which the warning information can be recognized.

In other words, in a case where $Tp2 \geq Tr$, it is determined that the warning information can be provided (that there is a danger of collision with the first moving body 9b) when $Tp1 \leq Tds+Tp2$ is established. In a case where $Tp2<Tr$, it is determined that the warning information can be provided (that there is a danger of collision with the first moving body 9b) when $Tp1 \leq Tds+Tr$ is established.

When it is determined in the above process that the warning information may be provided, the information provision determination unit 904 transmits a determination result having the order of precedence 4 (when the oncoming vehicle is an automobile) or the order of precedence 5 (when the oncoming vehicle is a motorcycle) to the HMI output control unit 906 and shifts to State 5 in a step ST211. When it is determined that information provision is not possible, the information provision determination unit 904 transmits a determination result having the order of precedence 3 to the HMI output control unit 906 and shifts to State 4 in a step ST210.

Figure 11:
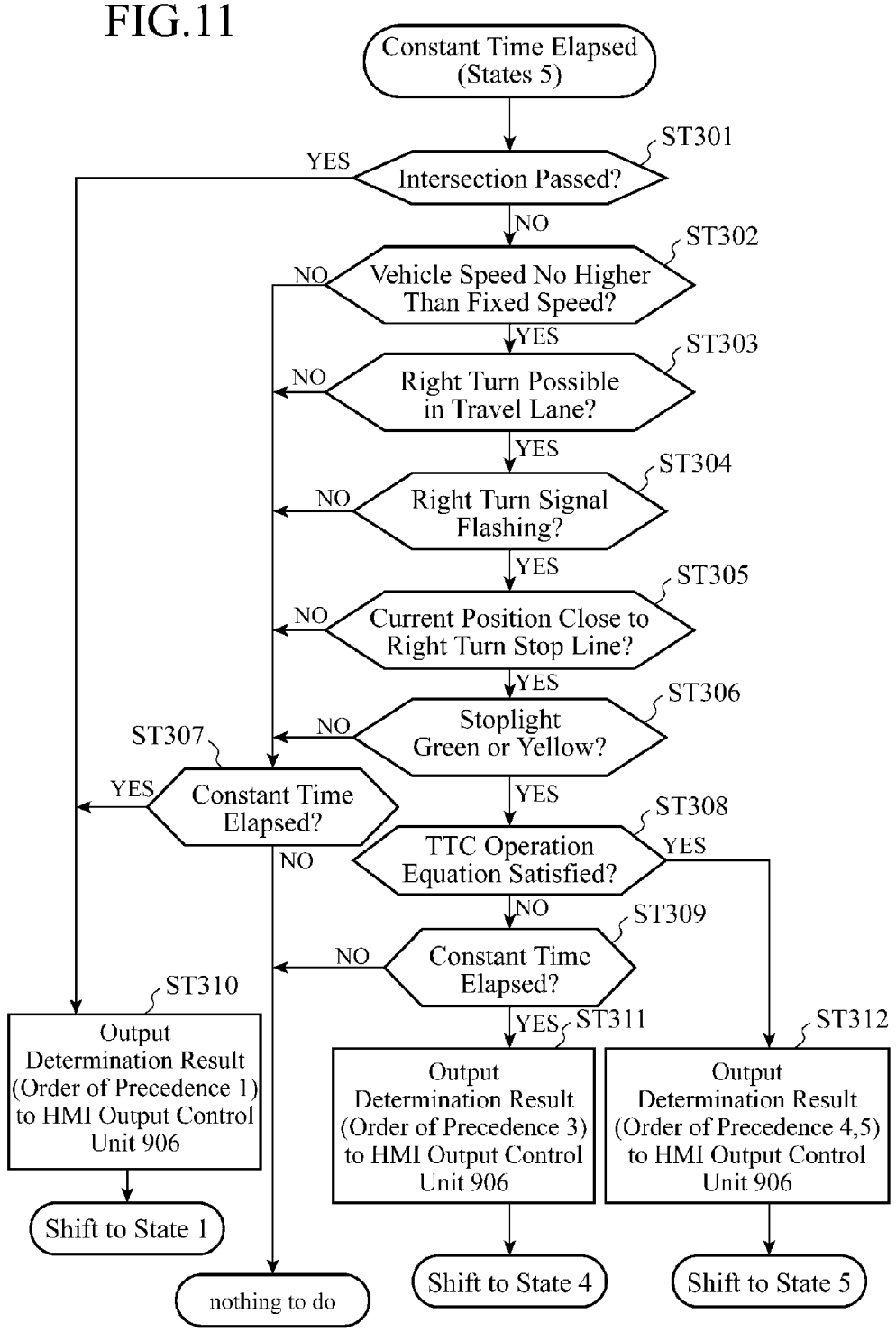
FIG. 11 is a flowchart showing an example of a determination as to whether or not to provide information according to Embodiment 1 of the invention.

FIG. 11 is a flowchart illustrating an operation of the vehicle-mounted apparatus 9 according to Embodiment 1. FIG. 11 shows an operation performed by the information provision determination unit 904 in State 5 of FIG. 8. Note that likewise in State 5, the operation is performed for each constant period.

Operations performed in steps ST301 to ST308 are identical to the operations performed in the steps ST201 to ST208 of FIG. 10, and therefore descriptions of these operations will be omitted. When the TTC equation is not satisfied in a step ST309, in other words, following the elapse of a constant time after determining that an oncoming vehicle corresponding to the service no longer exists, it is determined in a step ST311 that the vehicle has crossed the intersection. Accordingly, the information provision determination unit 904 transmits a determination result having the order of precedence 3 to the HMI output control unit 906 and shifts to State 4. Note that as long as the operation advances to the step ST307 and the corresponding state remains established continuously for a certain time, it is determined in a step ST310 that the service is complete, whereupon the information provision determination unit 904 transmits a determination result having the order of precedence 1 to the HMI output control unit 906 and shifts to State 1. When the state does not remain established continuously for the constant time, no processing is performed.

When the TTC equation is satisfied, the information provision determination unit 904 transmits a determination result having the order of precedence 4 (when the oncoming vehicle is an automobile) or the order of precedence 5 (when the oncoming vehicle is a motorcycle) to the HMI output control unit 906 and shifts to State 5 in a step ST312. Here, when the TTC equation is satisfied and a brake signal varies from ON to OFF, it is determined that the danger of a collision is high, and therefore the information provision determination unit 904 transmits a determination result having the order of precedence 6 (when the oncoming vehicle is an automobile) or the order of precedence 7 (when the oncoming vehicle is a motorcycle) to the HMI output control unit 906 and shifts to State 5.

As described above, in the vehicle-mounted apparatus according to Embodiment 1, decoding processing on the obstruction information, intersection information, stoplight information, and so on obtained by communication with the roadside communication apparatus, storage and management of the vehicle information relating to the moving body and so on, and HMI control based on the determination result obtained by the information provision determining section are respectively performed in individual modules, and the determination result is constituted by the service type and the order of precedence. Therefore, the information provision determining section can be separately provided for each service type, and as a result, the system can be expanded easily in order to accommodate expected future increases in the number of provided services.

Embodiment 2

In Embodiment 2, a case in which the right turn collision prevention service and the pedestrian crossing information provision service are provided simultaneously at the intersection shown in FIG. 1 will be described. Note that the intersection, the roadside narrow-band wireless communication apparatus, and the vehicle-mounted apparatus used in Embodiment 2 are constituted identically to those of Embodiment 1 shown in FIGS. 1 to 3, and therefore descriptions of these components will be omitted.

Table 4 shows a constitutional example of determination results for the pedestrian crossing information provision service according to Embodiment 2. The determination results are constituted identical to those shown in Table 2, and therefore descriptions of the results will be omitted.

TABLE 4

| Service type | Order of precedence | Reproduced image | Reproduced audio |
|---|---|---|---|
| 9: Pedestrian crossing information provision service | 0, 6 to 63 | Not defined | Not defined |
| | 1 | No display | None |
| | 2 | Defer | Defer |
| | 3 | Under Service | None |
| | 4 | Pedestrian | "Beware of pedestrian" |
| | 5 | Motorcycle | "Beware of bicycle" |

Table 5 shows an example of guaranteed reproduction times of the pedestrian crossing information provision service, which are held by the parameter management unit 907 according to Embodiment 2. The guaranteed reproduction times are identical in content to those shown in Table 3, and therefore descriptions of the times will be omitted.

TABLE 5

| Service type | Order of precedence | Guaranteed reproduction time |
|---|---|---|
| 9: Pedestrian crossing information provision service | 0, 6 to 63 | Not defined |
| | 1 | 0 |
| | 2 | Defer |
| | 3 | 1 [sec] |
| | 4 | 2 [sec] |
| | 5 | 2 [sec] |

Table 6 shows a constitutional example of under-service orders of precedence held by the parameter management unit 907 according to Embodiment 2. The under-service order of precedence is a parameter for defining orders of precedence of the under-service display of each service type in a case where competing contents relating only to under service (order of precedence 3) exist among the respective service types in Table 2.

TABLE 6

| Service name | Under service (order of precedence 3) order of precedence | Service name | Under Service (order of precedence 3) order of precedence |
|---|---|---|---|
| Accident mode information provision service | 1 | Right turn collision information provision service | 3 |
| Temporary stop regulation information provision service | 2 | Left turn involvement information provision service | 3 |
| Head-on collision information provision service | 3 | Pedestrian crossing information provision service | 2 |
| Speed information provision service | 1 | Main road convergence assistance information provision service | 2 |
| Oncoming vehicle approach information provision service | 2 | Rear-end collision prevention information provision service | 3 |
| Danger zone avoidance control service | 2 | Stoplight information provision service | 1 |

Figure 12:
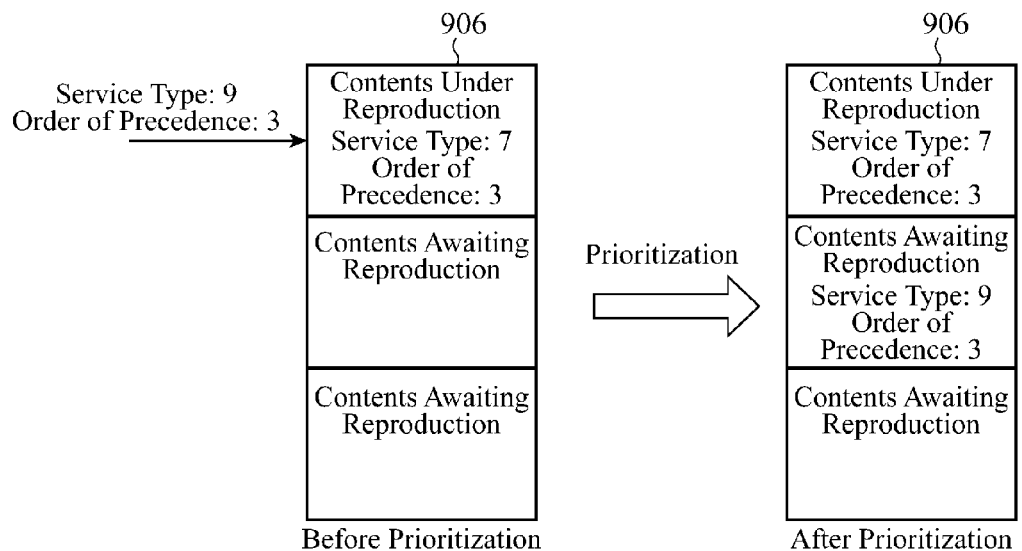
FIG. 12 is a view illustrating a method of determining an order of precedence relating to an HMI output request according to Embodiment 2 of the invention.

FIG. 12 shows an example of an operation of the HMI output control unit 906 according to Embodiment 2 of the present invention. FIG. 12 is constituted similarly to FIG. 4, and therefore descriptions of FIG. 12 will be omitted. As shown in FIG. 12, when the HMI output control unit 906 has the contents under reproduction under service, as shown in Tables 2 and 4, and similarly, when the HMI output control unit 906 obtains a determination result including the under-service contents, a parameter indicating the under-service order of precedence shown in Table 6 is obtained from the parameter management unit 907, whereupon the contents relating to the service type having the higher under-service order of precedence are selected and reproduced.

In the case of an update, the determination result is forwarded to the information provision output apparatus 901 and held as the contents under reproduction after taking into account the guaranteed reproduction time shown in Table 5. Note that all of the contents that can be provided may be forwarded such that the information provision output apparatus 901 displays icons corresponding to all of the under-service displays.

Figure 13:
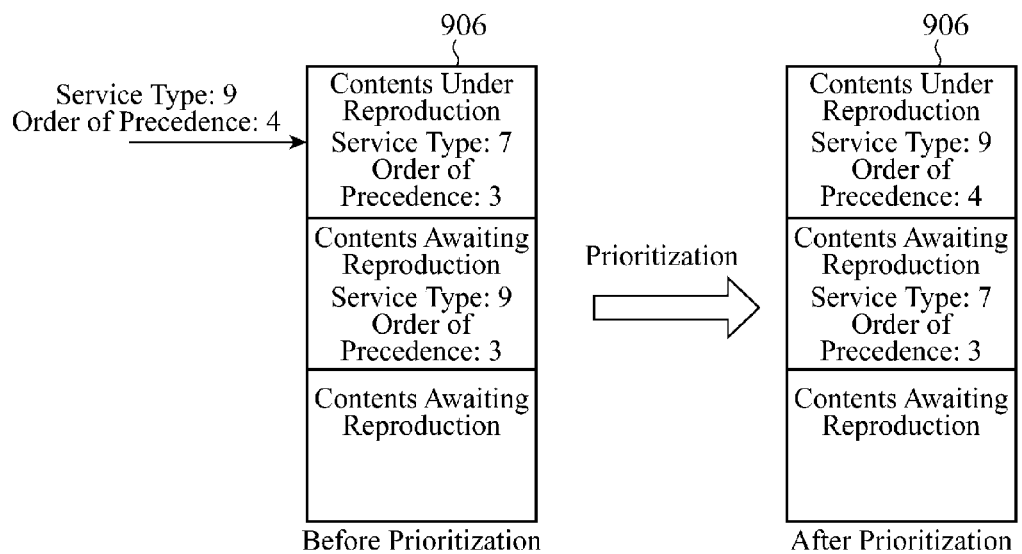
FIG. 13 is a view illustrating a method of determining an order of precedence relating to an HMI output request according to Embodiment 2 of the invention.

FIG. 13 shows an example of an operation of the HMI output control unit 906 according to Embodiment 1 of the present invention. FIG. 13 is constituted similarly to FIG. 4, and therefore descriptions of FIG. 13 will be omitted. As shown in FIG. 13, when the contents under reproduction and the contents awaiting reproduction held by the HMI output control unit 906 correspond only to under service and when a determination result corresponding to an alert (order of precedence 4 and above) is obtained, the determination result is forwarded to the information provision output apparatus 901 and held as the contents under reproduction regardless of the under-service order of precedence.

FIG. 7 shows a constitutional example of the alert orders of precedence held by the parameter management unit 907 according to Embodiment 1. The alert order of precedence is a parameter for defining orders of precedence of the alert displays of each service type in a case where competing contents relating only to an alert (order of precedence 4 and above) exist among the respective service types shown in Table 1. It is assumed hereafter that an alert denotes contents having the order of precedence 4 and above relating to each service type.

TABLE 7

| Service name | Alert (order of precedence 4 and above) order of precedence | Service name | Alert (order of precedence 4 and above) order of precedence |
|---|---|---|---|
| Accident mode information provision service | 1 | Right turn collision information provision service | 3 |
| Temporary stop regulation information provision service | 2 | Left turn involvement information provision service | 3 |
| Head-on collision information provision service | 3 | Pedestrian crossing information provision service | 2 |
| Speed information provision service | 1 | Main road convergence assistance information provision service | 2 |
| Oncoming vehicle approach information provision service | 2 | Rear-end collision prevention information provision service | 3 |
| Danger zone avoidance control service | 2 | Stoplight information provision service | 1 |

Figure 14:
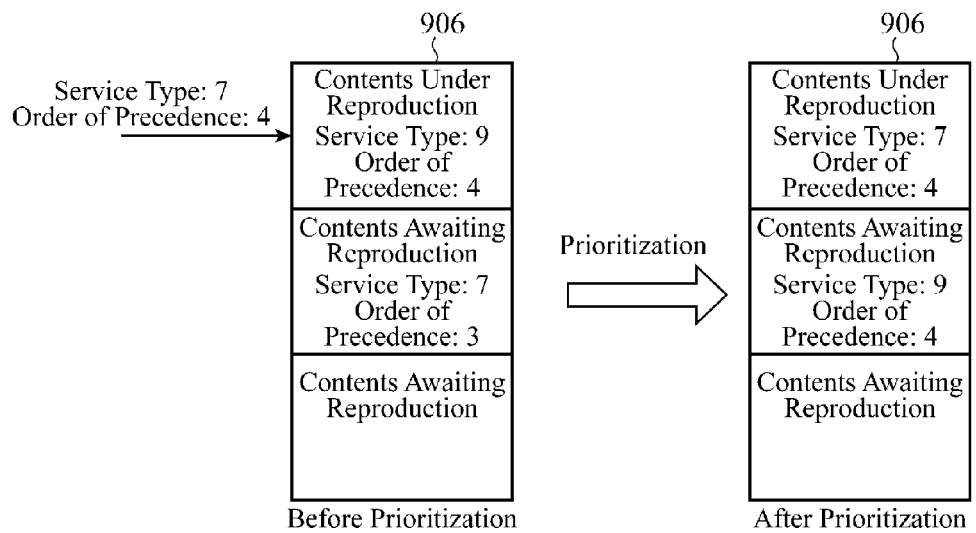
FIG. 14 is a view illustrating a method of determining an order of precedence relating to an HMI output request according to Embodiment 2 of the invention.

FIG. 14 shows an example of an operation of the HMI output control unit 906 according to Embodiment 2. FIG. 14 is constituted similarly to FIG. 4, and therefore descriptions of FIG. 14 will be omitted. As shown in FIG. 14, when the contents under reproduction held by the HMI output control unit 906 corresponds to an alert and a determination result corresponding to an alert has been obtained, the parameter indicating the alert order of precedence shown in Table 7 is obtained from the parameter management unit 907, whereupon the contents relating to the service type having the higher alert order of precedence is selected and reproduced. In the case of an update, the determination result is forwarded to the information provision output apparatus 901 and held as the contents under reproduction after taking into account the guaranteed reproduction time shown in Table 4.

Figure 15:
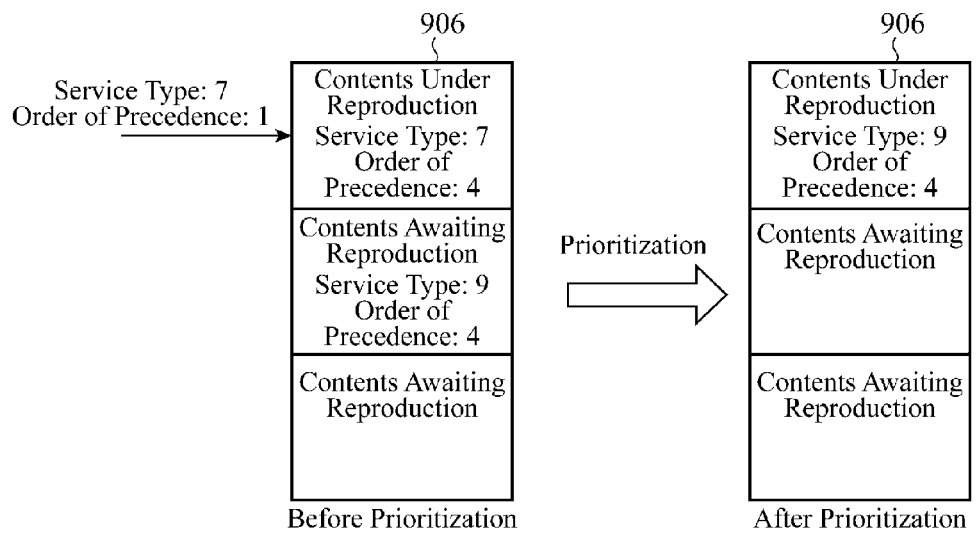
FIG. 15 is a view illustrating a method of determining an order of precedence relating to an HMI output request according to Embodiment 2 of the invention.

FIG. 15 shows an example of an operation of the HMI output control unit 906 according to Embodiment 2. FIG. 15 is constituted similarly to FIG. 4, and therefore descriptions of FIG. 15 will be omitted. As shown in FIG. 15, when the HMI output control unit 906 holds contents under reproduction and so on relating to a plurality of service types and a determination result corresponding to contents indicating no display has been obtained, the HMI output control unit 906 transmits a determination result corresponding to the contents under reproduction to the information provision output apparatus 901 after deleting the contents under reproduction or contents awaiting reproduction having the same service type as the determination result.

The parameter management unit 907 also holds parameters indicating an information effective time and a minimum reproduction time.

The information effective time defines an effective time during which information provision is possible. When contents have been held as the contents awaiting reproduction for a constant time or more, the contents are discarded due to the fact that a time interval between the point at which the information provision determination unit 904 determines that information provision is possible and reproduction of the contents by the information provision output apparatus 901 is too long.

Further, the minimum reproduction time defines an effective time of reproduced provided information. The minimum reproduction time is provided for situations in which it is not possible to build enough momentum to delete the provided information during provision of a service using singly distributed information such as information provided from an optical beacon. When the minimum reproduction time has elapsed, the provided information is deleted.

Figure 16:
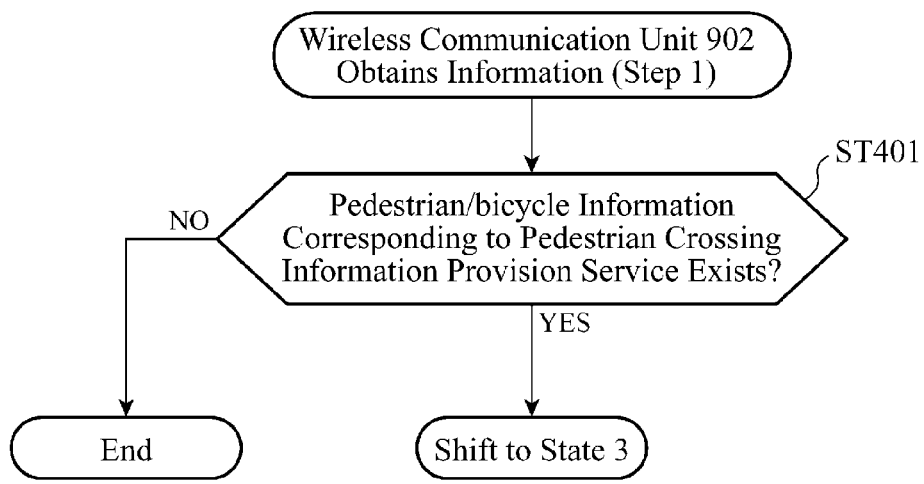
FIG. 16 is a flowchart showing an example of a determination as to whether or not a service is effective according to Embodiment 2 of the invention.

FIG. 16 is a flowchart illustrating an operation of the vehicle-mounted apparatus 9 relating to the pedestrian crossing information provision service according to Embodiment 2. Note that the operational outline of the vehicle-mounted apparatus 9 is identical to that of the state transition diagram shown in FIG. 8, and therefore descriptions thereof will be omitted. FIG. 16 shows an operation performed by the information provision determination unit 904 in State 2 of FIG. 8. First, a determination is made as to whether or not the second moving body 9*a* entering the intersection has obtained the information required for the pedestrian crossing information provision service. When the wireless communication unit 902 has obtained the information from the roadside communication apparatus 2*a* through wireless communication, the information provision determination unit 904 checks in a step ST401 whether or not information indicating the existence of a pedestrian/bicycle crossing a pedestrian crossing corresponding to the service exists in the information storing/managing section 905.

When pedestrian/bicycle information cannot be obtained in the process described above, the operation is terminated (no processing is performed until information is next obtained). When pedestrian/bicycle information can be obtained, the information provision determination unit 904 shifts to State 3.

Figure 17:
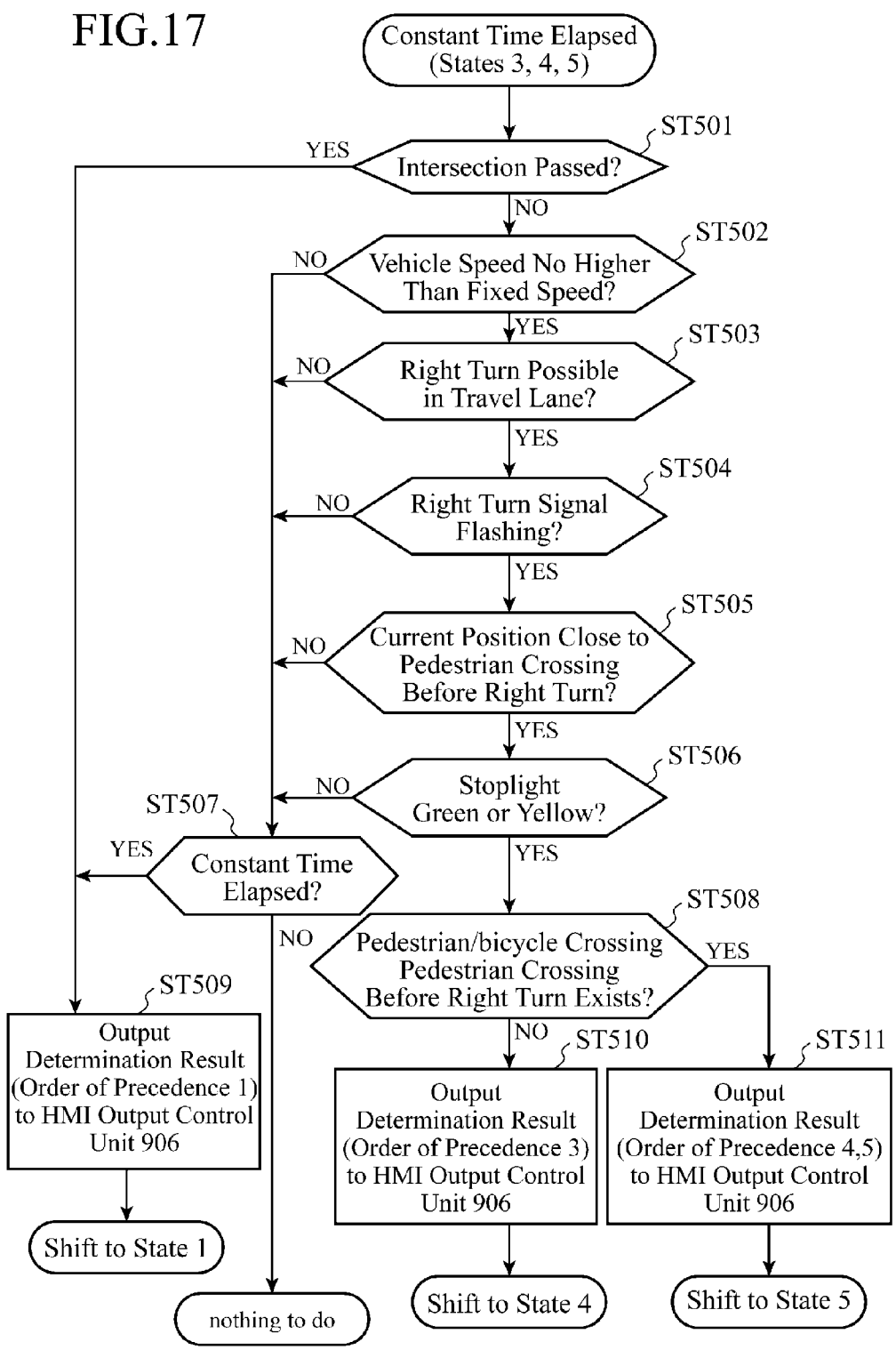
FIG. 17 is a flowchart showing an example of a determination as to whether or not to provide information according to Embodiment 2 of the invention.

FIG. 17 is a flowchart illustrating an operation of the vehicle-mounted narrow-band wireless communication apparatus 9 according to Embodiment 2 of the present invention. FIG. 17 shows an operation performed by the information provision determination unit 904 in States 3 to 5 of FIG. 8. Note that in States 3 to 5, this operation is performed for each constant period. In a step ST501, a determination is made as to whether or not the second moving body 9*a* has crossed the intersection. More specifically, the information provision determination unit 904 determines that the intersection has been crossed when the intersection information obtained from the information storing/managing section 905 indicates that the traveled distance of the host vehicle is large.

When the above process shows that the intersection has been crossed, the information provision determination unit 904 determines that the service is complete. Accordingly, the information provision determination unit 904 transmits a determination result having the order of precedence 1 to the HMI output control unit 906 and shifts to State 1.

Next, a determination as to whether or not the second moving body 9a entering the intersection is a moving body to which the pedestrian crossing information provision service according to Embodiment 2 can be provided is made in steps ST502 to ST506.

As a specific determination method, the second moving body 9a is determined to be a vehicle turning right, i.e. a vehicle to which the aforesaid pedestrian crossing information should be provided, when all of the following requirements are satisfied: the vehicle speed is no higher than a fixed speed indicating that the second moving body 9a is turning right in the step ST502; the second moving body 9a is traveling in a lane where a right turn is possible in the step ST503; a right turn signal is flashing in the step ST504; the second moving body 9a is currently positioned in the vicinity of a pedestrian crossing before a right turn in the step ST505; and a stoplight is green or yellow, indicating that travel is possible, in the step ST506.

When it is determined in the above process that the second moving body 9a is not a right-turning vehicle, the operation advances to a step ST507, and as long as this state remains established continuously for a constant time, it is determined in a step ST509 that the service is complete, whereupon the information provision determination unit 904 transmits a determination result having the order of precedence 1 to the HMI output control unit 906 and shifts to State 1. When the state does not remain established continuously for the constant time, no processing is performed. When the second moving body 9a is determined to be a right-turning vehicle, the operation advances to a step ST508.

In the step ST508, a determination is made as to whether or not a pedestrian or a bicycle crossing the pedestrian crossing before the right turn exists. More specifically, the information provision determination unit 904 determines whether or not information indicating the existence of a pedestrian/bicycle crossing the pedestrian crossing corresponding to the service has been obtained from the information storing/managing section 905.

When it is determined in the above process that warning information can be provided, the information provision determination unit 904 transmits a determination result having the order of precedence 4 (when a pedestrian exists on the pedestrian crossing) or the order of precedence 5 (when a bicycle exists on the pedestrian crossing) to the HMI output control unit 906 and shifts to State 5 in a step ST511. When it is determined that information provision is not possible, the information provision determination unit 904 transmits a determination result having the order of precedence 3 to the HMI output control unit 906 and shifts to State 4 in a step ST510.

As described above, the vehicle-mounted apparatus according to Embodiment 2 has an identical constitution to that of Embodiment 1, and can therefore operate at an intersection where a plurality of services are provided without modifying the information provision determining section relating to other pre-existing service types. As a result, multi-service information provision can be performed.

Embodiment 3

Figure 18:
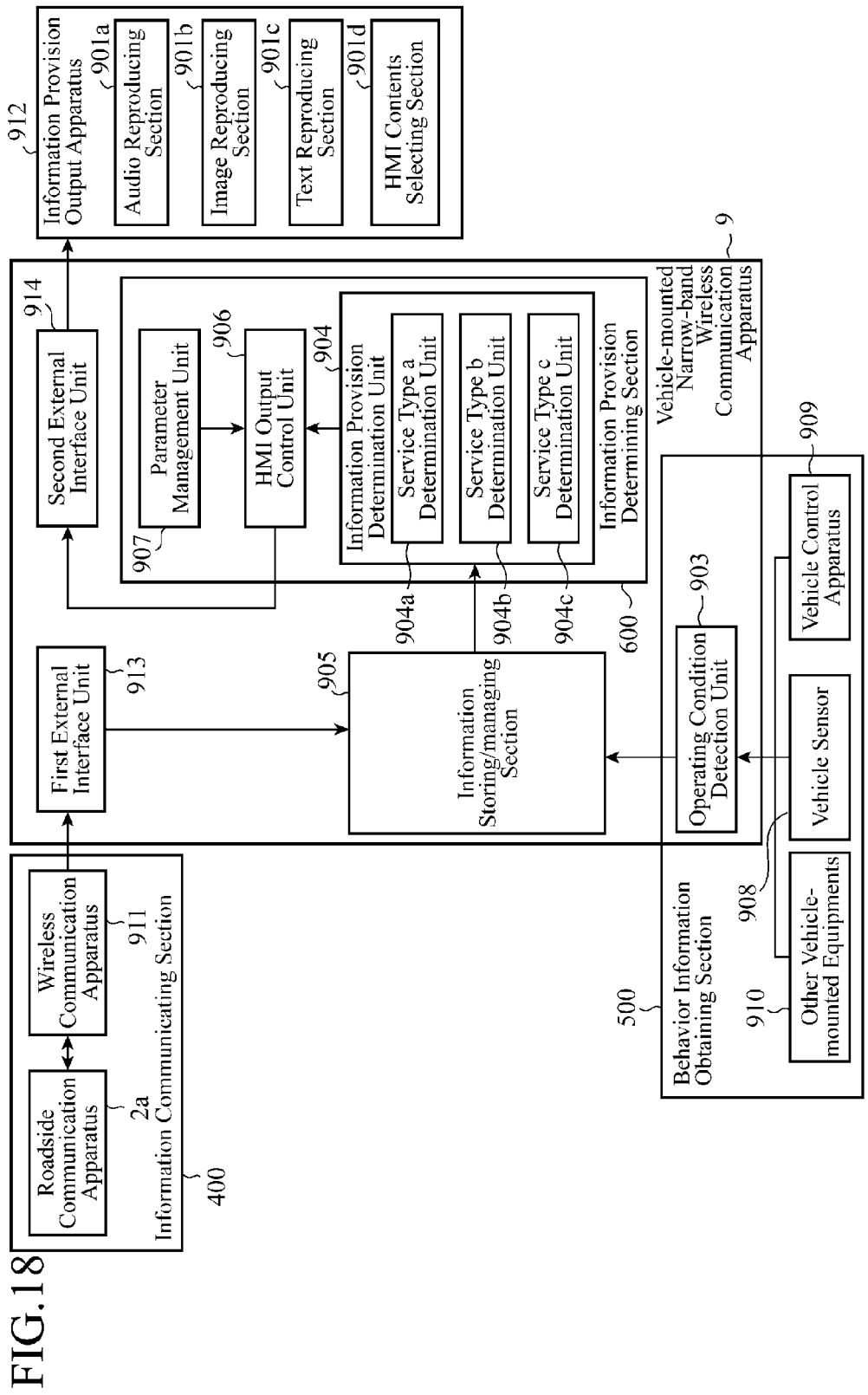
FIG. 18 is a block diagram showing the constitution of a vehicle-mounted narrow-band wireless communication apparatus according to Embodiment 3 of the invention.

FIG. 18 is a block diagram showing the constitution of the vehicle-mounted apparatus 9 according to Embodiment 3. In Embodiment 3, the wireless communication unit 902 and the information provision output apparatus 901 of the vehicle-mounted 9 according to Embodiment 1 are disposed on different apparatuses (a wireless communication apparatus 911 and an information provision output apparatus 912), and an interface between the wireless communication apparatus 911 and the information provision output apparatus 912 is provided additionally. Further, the vehicle-mounted apparatus 9 is connected to the wireless communication apparatus 911 and the information provision output apparatus 912 via respective external interfaces 913, 914.

An ITS vehicle-mounted apparatus described in Standard JEITA-TT-6001 of the Japan Electronics and Information Technology Industries Association or the like may be applied to the wireless communication apparatus 911 and the information provision output apparatus 912, and an interface described in Patent Document "Japanese Patent Application Publication No. 2007-067886" or the like may be applied to the interface between the wireless communication apparatus 911 and the information provision output apparatus 912.

When a communication protocol used by the first external interface unit 913 is employed as a protocol used by the second external interface unit 914 at this time, a vehicle-mounted apparatus constituted by the wireless communication apparatus 911 and the information provision output apparatus 912, such as a standardized ITS vehicle-mounted apparatus, can be used as the wireless communication apparatus 911 and the information provision output apparatus 912.

FIG. 19 illustrates an operation of the vehicle-mounted apparatus 9 according to Embodiment 3. In a step ST601, the first external interface unit 913 of the vehicle-mounted apparatus 9 obtains complete driving assistance information from the wireless communication apparatus 911.

Ina step ST602, the information storing/managing section 905 and information provision determination unit 904 of the vehicle-mounted apparatus 9 determine whether or not safe driving assistance can be performed using the same method as Embodiments 1 and 2. Here, when safe driving assistance information exists, a request to output the safe driving assistance information is issued to the HMI output control unit 906.

In a step ST603, the HMI output control unit 906 generates an HMI output request message (FIG. 20) constituted by an order of precedence and service information. Note that the HMI output request message is constituted similarly to the determination result of Embodiment 1.

In a step ST604, the HMI output control unit 906 transmits the HMI output request message created in the step ST603 using the second external interface unit 914.

As described above, according to Embodiment 3, a standardized ITS vehicle-mounted apparatus can be used as the wireless communication apparatus 911 and the information provision output apparatus 912, and therefore a vehicle-mounted apparatus that is capable of providing safe driving assistance information can be constructed at a reasonable cost.

Further, when an additional service is provided, a control processing part for the safe driving assistance information is provided independently as a dedicated service type determination unit, and therefore the system can be more easily expanded to accommodate additional provided services and the like.

Note that in Embodiment 3, the wireless communication apparatus and the information provision output apparatus are both disposed on different apparatuses, but a constitution in which only one of these apparatuses is disposed on a different apparatus may be provided.

Further, two types of external interface units are provided as external interface units, but when a network or a bus type communication line in which communication can be performed by a plurality of node CANs on a single communication line, such as an Internet protocol or a CAN, is used, the external interface units 913, 914 may be combined.

INDUSTRIAL APPLICABILITY

The vehicle-mounted narrow-band wireless communication apparatus according to the present invention is capable of executing information provision to a driver at an appropriate timing and so on, and is therefore useful for preventing collisions at convergence points of intersections and so on.

The invention claimed is:

1. A vehicle-mounted narrow-band wireless communication apparatus comprising:
  a wireless communication unit for receiving, through dedicated narrow-band communication, roadside information relating to a junction that is supplied from a roadside communication apparatus having a communication area that covers a part of a geographical area within a predetermined distance of the junction;
  an operating condition detection unit for detecting an operating condition of a host vehicle;
  a parameter management unit for managing parameters relating to an HMI;
  information storing/managing section for storing and managing the roadside information from the wireless communication unit and operating condition information from the operating condition detection unit;
  an information provision determination unit for determining whether or not warning information can be provided on the basis of the roadside information and the operating condition information obtained from the information storing/managing section;
  an HMI output control unit for controlling HMI output on the basis of a determination result from the information provision determination unit and the parameters obtained from the parameter management unit; and
  an information provision output apparatus for performing information provision on the basis of an HMI output request transmitted from the HMI output control unit.

2. The vehicle-mounted narrow-band wireless communication apparatus according to claim 1, wherein the information provision determination unit comprises an independent service type determination unit for each type of provided service, and transmits a determination result indicating whether or not information provision is possible to the HMI output control unit for each service type.

3. The vehicle-mounted narrow-band wireless communication apparatus according to claim 1, wherein in the case where the information provision output apparatus updates contents under reproduction, when an identical service is to be provided, the HMI output control unit determines whether or not to transmit the HMI output request on the basis of an order of precedence.

4. The vehicle-mounted narrow-band wireless communication apparatus according to claim 1, wherein in the case where the information provision output apparatus updates contents under reproduction, when an identical service is to be provided, the HMI output control unit determines whether or not to transmit the HMI output request on the basis of an order of precedence relating to a service type, obtained from the parameter management unit.

5. The vehicle-mounted narrow-band wireless communication apparatus according to claim 1, wherein in the case where the information provision output apparatus updates contents under reproduction, the HMI output control unit determines a transmission timing of the HMI output request on the basis of a guaranteed reproduction time obtained from the parameter management unit.

6. The vehicle-mounted narrow-band wireless communication apparatus according to claim 1, wherein in the case where a service for avoiding a collision between a second moving body intending to turn right and a first moving body advancing directly in an opposing lane is provided, the information provision determination unit determines that the first moving body and the second moving body are in danger of colliding with each other, when a predicted junction arrival time of the first moving body is smaller than a value obtained by adding an internal delay time of a vehicle-mounted device required to provide a driver of the second moving body with information to the larger one of a predicted junction arrival time and a required right turn time of the second moving body.

7. The vehicle-mounted narrow-band wireless communication apparatus according to claim 1, wherein in the case where a service for avoiding a collision between a second moving body intending to turn right and a first moving body advancing directly in an opposing lane is provided, when the information provision determination unit determines that the first moving body and the second moving body are in danger of colliding with each other and also brake information varies from ON to OFF, the information provision determination unit transmits a determination result including a modified order of precedence to the HMI output control unit.

8. A vehicle-mounted narrow-band wireless communication apparatus comprising:
  a first external interface unit for communicating with an external wireless communication apparatus in accordance with a predetermined communication protocol;
  a second external interface unit for communicating with an information provision output apparatus in accordance with a predetermined communication protocol;
  an operating condition detection unit for detecting an operating condition of a host vehicle;
  a parameter management unit for managing parameters relating to an HMI;
  information storing/managing section for managing travel assistance information obtained from the first external interface unit and host vehicle information obtained from the operating condition detection unit;
  one or more information provision determination unit for determining whether or not warning information can be provided on the basis of the information managed by the information storing/managing section; and
  an HMI output control unit for controlling HMI output on the basis of a determination result from the information provision determination unit the parameters obtained from the parameter management unit,
  wherein the HMI output control unit outputs an HMI output request to the information provision output apparatus by using the second external interface unit.

9. A vehicle-mounted narrow-band wireless communication apparatus comprising:
  a first external interface unit for communicating with an external wireless communication apparatus in accordance with a predetermined communication protocol;
  an operating condition detection unit for detecting an operating condition of a host vehicle;
  a parameter management unit for managing parameters relating to an HMI;
  information storing/managing section for managing travel assistance information obtained from the first external interface unit and host vehicle information obtained from the operating condition detection unit;

an information provision determination unit, having one or more service type determination unit, for determining whether or not warning information can be provided on the basis of the information managed by the information storing/managing section;

an HMI output control unit for controlling HMI output on the basis of a determination result from the information provision determination unit and the parameters obtained from the parameter management unit; and an information provision output apparatus for performing information provision on the basis of an HMI output request generated by the HMI output control unit.

10. The vehicle-mounted narrow-band wireless communication apparatus according to claim 8, wherein the communication protocol used by the first external interface unit is identical to that used by the second external interface unit.

11. The vehicle-mounted narrow-band wireless communication apparatus according to claim 8, wherein the HMI output request is constituted by a type of provided service and an order of precedence.

12. A roadside-to-vehicle narrow-band wireless communication system comprising:

a roadside narrow-band wireless communication apparatus for outputting roadside information on the basis of various information relating to a junction and a neighbourhood thereof;

a roadside communication apparatus which has a communication area that covers a part of a geographical area within a predetermined distance of the junction, and releases the roadside information supplied from the roadside narrow-band wireless communication apparatus through dedicated narrow-band communication; and the vehicle-mounted narrow-band wireless communication apparatus according to claim 1 that receives, through dedicated narrow-band communication, the roadside information released by the roadside communication apparatus.

13. A roadside-to-vehicle narrow-band wireless communication system comprising:

a roadside narrow-band wireless communication apparatus for outputting roadside information on the basis of various information relating to a junction and a neighbourhood thereof;

a roadside communication apparatus which has a communication area that covers a part of a geographical area within a predetermined distance of the junction, and releases the roadside information supplied from the roadside narrow-band wireless communication apparatus through dedicated narrow-band communication; and the vehicle-mounted narrow-band wireless communication apparatus according to claim 8 that receives, through dedicated narrow-band communication, the roadside information released by the roadside communication apparatus.

14. The roadside-to-vehicle narrow-band wireless communication system according to claim 12, wherein the various information relating to the junction and the neighbourhood thereof is obtained based on the following:

a vehicle sensing apparatus for detecting a behavior of a first moving body entering the junction before the first moving body enters the junction;

a stoplight control apparatus for controlling a stoplight disposed at the junction;

a crossing condition detection apparatus for detecting a traffic condition at a pedestrian crossing; and a center for storing environment information relating to the neighbourhood of the junction.

15. The roadside-to-vehicle narrow-band wireless communication system according to claim 13, wherein the various information relating to the junction and the neighbourhood thereof is obtained from:

a vehicle sensing apparatus for detecting a behavior of a first moving body entering the junction before the first moving body enters the junction;

a stoplight control apparatus for controlling a stoplight disposed at the junction;

a crossing condition detection apparatus for detecting a traffic condition at a pedestrian crossing; and a center for storing environment information relating to the neighbourhood of the junction.

* * * * *